US007380281B2

(12) United States Patent
Genty et al.

(10) Patent No.: US 7,380,281 B2
(45) Date of Patent: May 27, 2008

(54) SYSTEM AND METHOD FOR AUTOMATICALLY HIDING SENSITIVE INFORMATION OBTAINABLE FROM A PROCESS TABLE

(75) Inventors: Denise Marie Genty, Austin, TX (US); Shawn Patrick Mullen, Buda, TX (US); James Stanley Tesauro, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 755 days.

(21) Appl. No.: 10/840,558

(22) Filed: May 6, 2004

(65) Prior Publication Data

US 2005/0257053 A1    Nov. 17, 2005

(51) Int. Cl.
   *G06F 17/30* (2006.01)
(52) U.S. Cl. .............................. 726/27; 726/30; 726/21
(58) Field of Classification Search .................. 726/30, 726/27, 26, 21
   See application file for complete search history.

(56) References Cited

OTHER PUBLICATIONS http://www.totse.com/en/hack/hack_attack/164400.html.*
One-way Web Hacking, Kelly Lum, Mar. 4, 2004.*
Improving the security of a dynamic look-up table based chaotic cryptosystem; Di Xiao; Xiaofeng Liao; Kwok-Wo Wong; Circuits and Systems II: Express Briefs, IEEE Transactions on [see also Circuits and Systems II: Analog and Digital Signal Processing, IEEE Transactions on] vol. 53, Issue 6, Jun. 2006 pp. 502-506.*
Look-up Table Based Chaotic Encryption of Audio Files Ganesan, K.; Muthukumar, R.; Murali, K.; Circuits and Systems, 2006. APCCAS 2006. IEEE Asia Pacific Conference on Dec. 4-7, 2006 pp. 1951-1954.*
A prefix space partitioning approach to scalable peer gateway discovery in secure virtual private networks Doshi, B.; Military Communications Conference, 2005. MILCOM 2005. IEEE Oct. 17-20, 2005 pp. 2735-2741 vol. 5.*

* cited by examiner

*Primary Examiner*—David Y Jung
(74) *Attorney, Agent, or Firm*—Duke W. Yee; Cas K. Salys; Theodore D. Fay, II

(57) ABSTRACT

The present invention provides a system and method for automatically hiding sensitive information, obtainable from a process table, from other processes that should not access the sensitive information. The system and method include a sensitive command attribute table that is used by a system administrator to designate the commands and command attributes that will typically be associated with sensitive information. The sensitive command attribute table is used when a command is entered that requests information from the process table to be displayed or output. In response, a search of the process table entries is made to determine if a command and/or its attribute in the process table matches an entry in the sensitive command attribute table. If so, the command, its attributes, and/or its attribute values are blanked from the output of the process table information.

8 Claims, 4 Drawing Sheets

| UID | PID | PPID | C | STIME | TTY | TIME | CMD |
|---|---|---|---|---|---|---|---|
| root | 1 | 0 | 0 | MAR 23 | ----- | 0:08 | /etc/init |
| root | 3540 | 1 | 0 | MAR 23 | ----- | 0:00 | /usr/lib/errdemon |
| root | 3656 | 1 | 0 | MAR 23 | ----- | 0:00 | /usr/ccs/bin/shlap |
| root | 4458 | 6024 | 0 | MAR 23 | ----- | 0:00 | /usr/sbin/syslogd |
| root | 4964 | 1 | 0 | MAR 23 | ----- | 5:31 | /usr/sbin/syncd 60 |
| root | 6024 | 1 | 0 | MAR 23 | ----- | 0:00 | /usr/sbin/srcmstr |
| daemon | 8230 | 6024 | 0 | MAR 23 | ----- | 0:00 | /usr/sbin/rpc.statd -d 0 -t 50 |
| ... | ... | ... | ... | ... | ... | ... | ... |
| root | 13446 | 9288 | 0 | 13:07:20 | ----- | 0:00 | telnetd -a |
| userid | 15512 | 12796 | 0 | 13:08:53 | pts/0 | 0:00 | /usr/bin/dbaddcmd -a ADD -u genty1075 -p user_pwd |

| COMMAND/ATTRIBUTE NAME | DATABASE LOCATION/NAME | ENCRYPTION/FORMAT TYPE |
|---|---|---|
| passwd | /etc/security/passwd | ONE-WAY UNIX PASSWORD |
| ikegui -p | /etc/ipsec/inet/DB/prekey.dir | ndbm FORMAT |
| ----- | /ipsec/ODM | CLEAR TEXT |
| ⋮ | ⋮ | ⋮ |
| dbaddcmd -ADD -p | /etc/security/passwd | ONE-WAY UNIX PASSWORD |

| COMMAND NAME | ATTRIBUTE NAME | DATABASE LOCATION/NAME | ENCRYPTION/ FORMAT TYPE |
|---|---|---|---|
| passwd | | /etc/security/passwd | ONE-WAY UNIX PASSWORD |
| ikegui | -p | /etc/ipsec/inet/DB/prekey.dir | ndbm FORMAT |
| ----- | | /ipsec/ODM | CLEAR TEXT |
| ⋮ | ⋮ | ⋮ | ⋮ |
| dbaddcmd | -ADD -p | /etc/cmd/db | HASHED |

SYSTEM AND METHOD FOR AUTOMATICALLY HIDING SENSITIVE INFORMATION OBTAINABLE FROM A PROCESS TABLE

BACKGROUND OF THE INVENTION

1. Technical Field

The present invention is generally directed to an improved data processing system and method. More specifically, the present invention is directed to a system and method for automatically hiding sensitive information that may be obtainable from a process table.

2. Description of Related Art

The process table is a table containing all of the information that must be saved when a processor switches from running one process to another in a multitasking computer system. The information in the process table allows the suspended process to be restarted at a later time as if it had never been stopped. Every process has an entry in the process table. These entries are known as control blocks and contain the process state, memory state and resource state for the corresponding process. The process state is the information needed so that the process can be loaded into memory and run, such as the program counter, the stack pointer, and the values of registers. The memory state is the details of the memory allocation, such as pointers to the various memory areas used by the program. The resource state is the information regarding the status of files being used by the process, such as a user ID file and a password file. Other parameters of the process may be stored in the process control block as necessary. An example of a process table is shown in FIG. 1.

In many operating systems, commands are provided for gaining access to the process table. For example, the "ps" command in the Linux, Unix and AIX operating systems allows information from the process table to be displayed for every process running on the computing system. In some situations, such commands may allow an unauthorized user to gain access to sensitive information that is stored in association with a process in the process table.

For example, when a user enters a command in a command line of the operating system, the command initiates a process which causes a process table entry to be created. This command may include sensitive information, such as a user identifier and password, credit card information, security key information, and the like. For example, the command ">dbaddcmd -a ADD -u genty -p user_pwd" adds a user whose user name is "genty" and whose password is "user_pwd" to an authorized user file in a local database.

As shown in FIG. 1, in response to this command being entered into the command line, a process is initiated and its corresponding process control block 110 is added to the process table 100. The process control block 110 includes the command 112 which designates the user name and password. Any user, even one that is not a root user may enter the "ps -ef" command and have the process table entry corresponding to process control block 110 displayed for their viewing. As a result, an unauthorized user that enters the "ps -ef" command may obtain access to this user name and password. This is a significant security problem.

There are basically two known solutions to this problem, neither of which provide an optimum solution. A first solution is to not allow a command line argument on a particular command. In this case, the user must execute the command and the command waits for standard input. The user then enters the input, which may be the sensitive information. Since the input is not a process, the input from the user is not recorded in the process control block for the command in the process table. An example of this solution is shown below:

>passwd genty
Changing passwords for "genty":
"genty"'s Old password:

Thus, in the above example, the command that would be entered into the process table is "passwd genty" and the actual password that is entered by the user at the prompt "Old password:" would not be displayed in the process table. The drawback of this solution is that users want to put script wrappers that automate the process around the command. That is, in order to automate the changing of a plurality of user passwords, a script wrapper may be placed on the command "passwd". However, in the above case where user input to a prompt is required, the script wrapper will not function appropriately. That is, the automation is negated by the need for user prompted input.

A second solution to the problem of sensitive information being accessible via the process table is to empty out the arguments of the command code that deals with sensitive information. For example, in the example command provided above, the sixth argument is associated with a password. Thus, the logic that handles the commands entered via the command line may receive the command, initiate a corresponding process and generate a corresponding process control block in the process table. Thereafter, the password may be copied to a variable and then the password argument may be set to null so that other processes cannot see it via the process table. The drawback of this solution is that there is a window of time between the creation of the process control block and the execution of the process that nulls the password argument. If an automated mechanism is used to continuously enter the "ps -ef" command, it is possible that the "ps -ef" may capture the process control block prior to the argument being nulled.

Thus, it would be beneficial to have an improved mechanism for securing sensitive information from being accessed via the process table. More specifically, it would be beneficial to have a system and method that maintains the security of sensitive information while permitting script wrappers to be used and eliminating windows of time when the sensitive information may be accessible via the process table.

SUMMARY OF THE INVENTION

The present invention provides a system and method for automatically hiding sensitive information, obtainable from a process table, from other processes that should not access the sensitive information. The system and method include a sensitive command attribute table that is used by a system administrator to designate the commands and command attributes that will typically be associated with sensitive information. The sensitive command attribute table is loaded into memory at system initialization time and is used when a command is entered that requests information from the process table to be displayed or output.

When a command is entered that displays or otherwise outputs information from the process table, the command handling code, e.g., the system call, retrieves the process control blocks of the process table and compares the commands and/or their attributes in the process table with the entries in the sensitive command attribute table. If a command and/or its attribute in the process table matches an entry in the sensitive command attribute table, then the command, its attributes, and/or its attribute values are blanked from the output of the process table information.

In a further embodiment of the present invention, the sensitive command attribute table includes, in the entries of the table, a field for designating the database locations where the attribute values corresponding to the command are stored and a field for designating the encryption type/format of the identified database. In this further embodiment, when there is a matching command or attribute, the value associated with the matching command or attribute may be converted to a proper format using the identified encryption type/format and then used to search the database identified in the database location field. If the value is present in any database listed in the sensitive command attribute table, then the value may be blanked from any output of the process table information. If the value is not present in the database, it is determined that the information is not sensitive and is permitted to be included in the process table information output.

In yet another embodiment of the present invention, the sensitive command attribute table includes a column designating the sensitive command and one or more additional columns for designating sensitive command attributes associated with the command. When using this sensitive command attribute table, a determination is made as to whether any of the process table entries have commands that match a command in the command column of the sensitive command attribute table. If so, any attribute value and/or the attribute name itself, corresponding to the command attribute columns associated with the matching command column entry are blanked in the process table information output.

The various embodiments of the present invention summarized above provide mechanisms that maintain the security of sensitive information stored in the process table while permitting script wrappers on commands. In addition, the present invention eliminates the window of opportunity that exists in solutions where the sensitive information in the process table is blanked by a separate process. These and other features and advantages of the present invention will be described in, or will become apparent to those of ordinary skill in the art in view of, the following detailed description of the preferred embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENTS

Figures 1, 2:
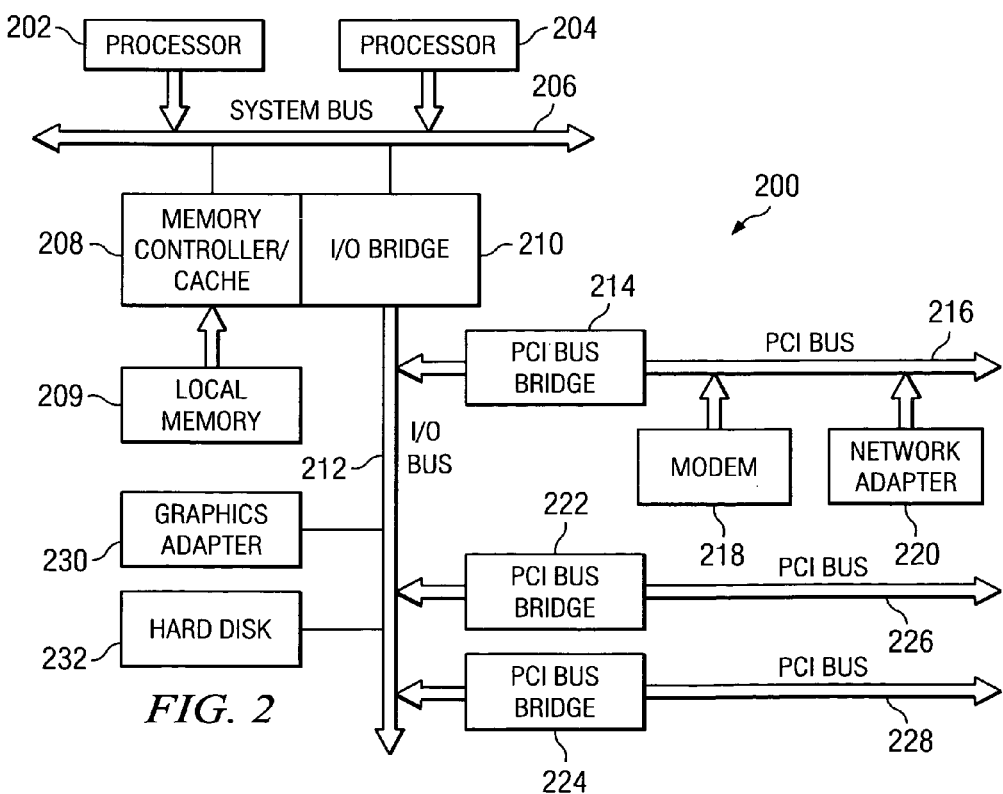
FIG. 1 is an exemplary diagram of a process table.
FIG. 2 is an exemplary diagram of a server data processing system in which aspects of the present invention may be implemented.
Figures 3, 4:
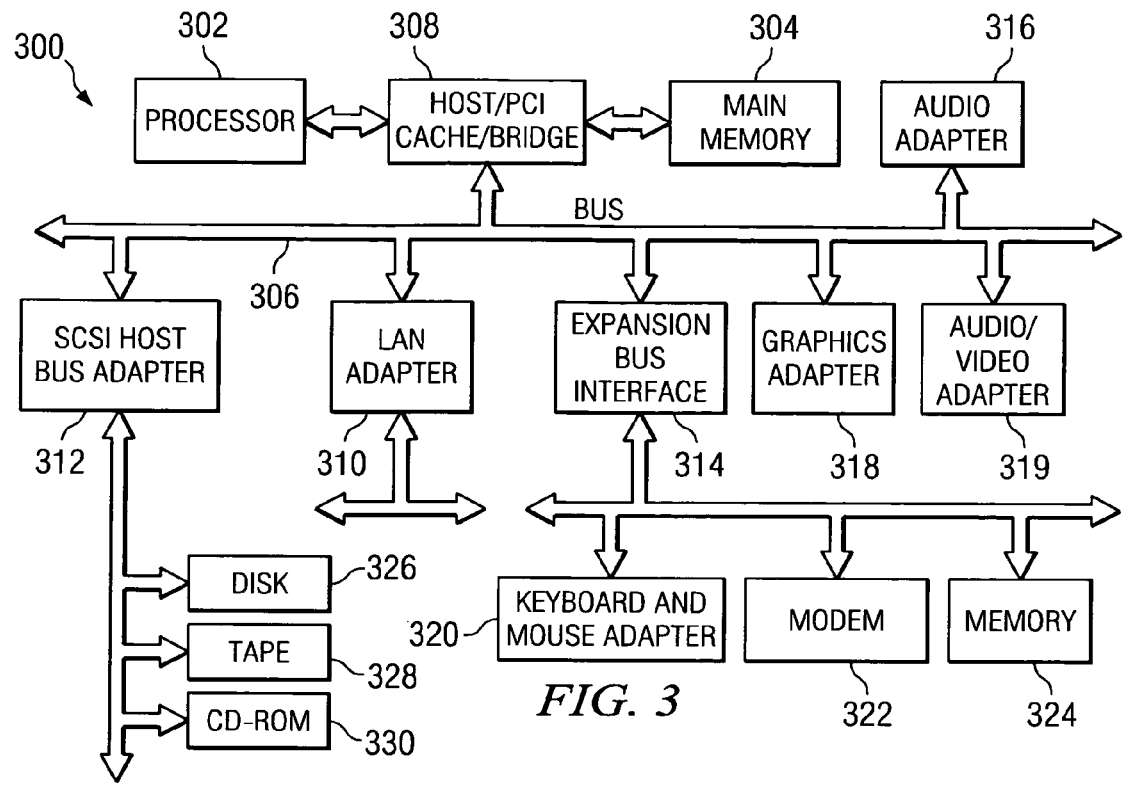
FIG. 3 is an exemplary diagram of a client or stand-alone processing system in which aspects of the present invention may be implemented.
FIG. 4 is an exemplary diagram of a sensitive command attribute table in accordance with one exemplary embodiment of the present invention.

The present invention provides mechanisms for ensuring the security of sensitive information in the process table of a data processing system. Therefore, in order to provide a context of a typical device in which the present invention may be implemented, FIGS. 2 and 3 are offered as exemplary diagrams of data processing systems in which aspects of the present invention may be implemented. It should be noted that the data processing systems illustrated in FIGS. 2 and 3 are only exemplary and is not intended to state or imply any limitation with regard to the data processing systems in which the present invention may be implemented.

Referring to FIG. 2, a block diagram of a data processing system that may be implemented as a server is depicted in accordance with an exemplary embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to client computing devices may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

FIG. 3 illustrates a block diagram of a client or stand-alone data processing system in which aspects of the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented programming system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interfaces As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

The present invention provides a system and method for automatically hiding sensitive information, obtainable from a process table, from other processes that should not access the sensitive information. The system and method include a sensitive command attribute table that is used by a system administrator to designate the commands and command attributes that will typically be associated with sensitive information. The sensitive command attribute table is loaded into memory at system initialization time and is used when a command is entered that requests information from the process table to be displayed or output.

FIG. 4 is an exemplary diagram of a sensitive command attribute table in accordance with one exemplary embodiment of the present invention. The sensitive command attribute table of FIG. 4 is only exemplary and may include additional or less information than that depicted. For example, rather than having a column for a command name, a column for database location and name, and a column for encryption/format type, other embodiments of the present invention may have a single column associated with a command name. Other embodiments may include additional information, such as columns for attribute names and the like, without departing from the spirit and scope of the present invention.

As shown in FIG. 4, in the depicted example of the sensitive command attribute table 400, a column 410 is provided for designating a command name or attribute name. In addition, a column 420 is provided for designating a database location and name where attribute values for the corresponding command or attribute are stored. A third column 430 is provided for designating the type of encryption or format that is used by the database identified in column 420. This information is used to determine when information retrieved from a process table is not to be included in the output of the process table information.

Figures 5, 6:
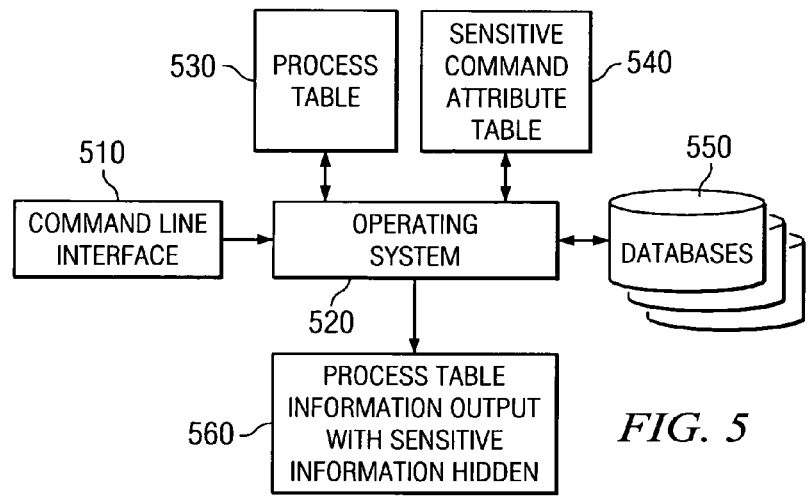
FIG. 5 is an exemplary diagram illustrating the interaction of the primary operational components of one exemplary embodiment of the present invention.
FIG. 6 is an exemplary diagram of a sensitive command attribute table in accordance with another exemplary embodiment of the present invention.

FIG. 5 is an exemplary diagram illustrating the interaction of the primary operational components of one exemplary embodiment of the present invention. As shown in FIG. 5, a command may be entered, via the command line interface 510, whose purpose is to display or otherwise output information from the process table 530. An example of such a command is the "ps -ef" command of the Linux, Unix and AIX operating systems. In the known systems, when such a command is received via the command line interface 510, the operating system 520 would simply retrieve the process table 530 and then display it or otherwise output the process table 530 for viewing by the user that entered the "ps -ef" command. That is, referring again to the process table example shown in FIG. 1, the depicted process table would be output including the command information 112 that includes sensitive password information, i.e. "user_pwd."

With the present invention, when such a command is entered via the command line interface 510, the command handling code in the operating system 520, e.g., the operating system call, retrieves the process control blocks of the process table 530 and the sensitive command attribute table 540 which has been pre-established by the system administrator and loaded at system initialization. The operating system then compares the commands and/or their attributes that are in the process table 530 entries with the entries in the sensitive command attribute table 540.

For example, taking the example process table 100 in FIG. 1 and the example sensitive command attribute table in FIG. 4, the command/attribute (CMD) of each entry in the depicted process table 100 is compared against column 410 of the sensitive command attribute table 400. In the depicted examples, when the last process control block 110 in FIG. 1 is encountered during this process, the command/attribute 112 of this process control block 110 matches an entry in column 410 of FIG. 4, i.e. the command dbaddcmd -ADD -p.

If a command and/or its attribute in the process table 530 matches an entry in the sensitive command attribute table 540, then the command, its attributes, and/or its attribute values may be blanked from the output 560 of the process table information.

In a further embodiment of the present invention, the entries of the sensitive command attribute table 540, as illustrated in the example shown in FIG. 4, include a field 420 for designating the database locations where the attribute values corresponding to the command are stored and a field 430 for designating the encryption type/format of the identified database. In this further embodiment, when there is a matching command or attribute, the value associated with the matching command or attribute may be converted to a proper format using the identified encryption type/format in the field 430 and then used to search the database identified in the database location field 420.

Thus, returning to FIG. 5, the operating system 520 may access one or more databases 550 identified by the sensitive command attribute table 540 to determine if the values associated with attributes of a command in the process table 530, which matches an entry in the sensitive command attribute table 540, are present in the one or more identified databases 550. If the attribute value is present in one of the identified databases 550, then the attribute value may be blanked from any output 560 of the process table information. If the value is not present in at least one of the identified databases 550, it is determined that the information is not sensitive and the attribute values are permitted to be included in the process table information output 560.

Thus, the present invention provides-mechanisms that maintain the security of sensitive information stored in the process table while permitting script wrappers on commands. In addition, the present invention eliminates the window of opportunity that exists in solutions where the sensitive information in the process table is blanked by a separate process. These advantages are obtained because the present invention does not require a modification to the commands being entered and does not require a modification to the data stored in the process table. To the contrary, the present invention provides a mechanism that merely blocks certain sensitive information stored in the process table from being output by another process.

In yet another embodiment of the present invention, the sensitive command attribute table includes a column designating the sensitive command and one or more additional columns for designating sensitive command attributes associated with the command. FIG. 6 is an exemplary diagram of a sensitive command attribute table in accordance with this additional exemplary embodiment of the present invention. As shown in FIG. 6, the sensitive command attribute table 600 includes a column 610 for designating the sensitive commands. Additionally, a column 620 is provided for designating corresponding attributes whose values, and optionally names, are to be blanked from the output of the process table information. Columns 630 and 640 are similar to columns 420 and 430 and store the database location/name and encryption/format type, respectively.

When using this sensitive command attribute table 600, a determination is made as to whether any of the process table entries have commands that match a command in the command column 610 of the sensitive command attribute table 600. If so, any attribute value and/or the attribute name itself, corresponding to the command attribute column 620 associated with the matching command column 610 entry are blanked in the process table information output, e.g., process table information output 560 in FIG. 5. In this way, the speed of operation of the present invention may be increased by eliminating the need to search the database 550 in FIG. 5 to determine if there is a matching attribute value.

It should be appreciated that while the present invention has been described in terms of the process status command "ps -ef" being entered as the command that instigates retrieval of the process table information, the present invention is not limited to this particular command line command. To the contrary, any command that may access the information stored in the process table and attempt to output that process table information for viewing or perceiving of an unauthorized user may be used with the present invention. In addition, flags other than "-ef" may be used, such as -m and -o which cause the process table information that is display to be kernel threads, without departing from the spirit and scope of the present invention.

Figure 7:
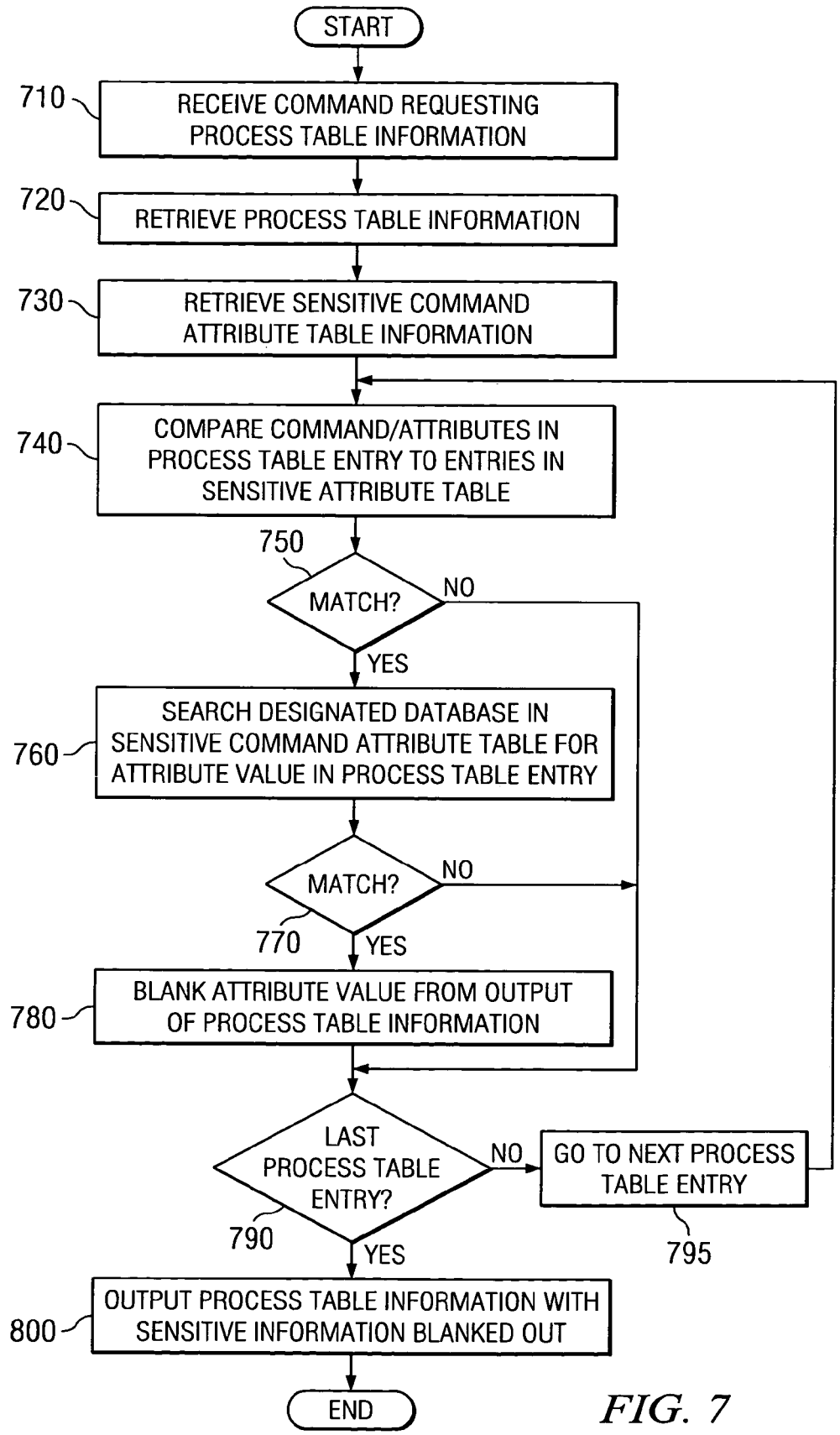
FIG. 7 is a flowchart outlining an exemplary operation of one embodiment of the present invention.

FIG. 7 is a flowchart outlining an exemplary operation of one embodiment of the present invention. It will be understood that each block of the flowchart illustration, and combinations of blocks in the flowchart illustration, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustration support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based computer systems which perform the specified functions or steps, or by combinations of special purpose hardware and computer instructions.

As shown in FIG. 7, the operation starts with receiving a command, such as via the command line interface, that requests information from the process table (step 710). The process table information is retrieved (step 720) and the sensitive command attribute table information is retrieved (step 730). The commands/attributes in the current process table entry is then compared to the entries in the sensitive command attribute table (step 740).

A determination is made as to whether there is a match between the current process table entry commands/attributes and an entry in the sensitive command attribute table (step 750). If so, a search of the database(s) designated in the sensitive command attribute table entry that was matched is performed (step 760). The search attempts to find the attribute value(s) associated with the current process table entry in the designated database(s).

A determination is made as to whether there is a matching entry in the designated database(s) for the attribute value(s) of the current process table entry (step 770). If so, the attribute value is blanked from the process table information output (step 780). Thereafter, or if the result of steps 750 or 770 is a "no match" result, the operation continues to step 790 where a determination is made as to whether the current process table entry is the last process table entry. If it is the last process table entry, the process table information is output with sensitive information identified by the present process being blanked out (step 800). If the process table entry is not the last process table entry, the operation goes to the next process table entry-(step 795) and returns to step 740.

Thus, the present invention provides a mechanism for ensuring the security of sensitive information that may be included in the process table of a data processing system. The present invention provides a mechanism for blanking or removing this sensitive information from any output of the process table. In this way, unauthorized processes may not retrieve sensitive information that they do not need and thus, unauthorized users cannot gain access to the sensitive information that may be stored in the process table.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for removing sensitive information from an output of process table information, comprising:

obtaining the process table information;

obtaining sensitive command attribute table information, wherein the sensitive command attribute table identifies commands associated with sensitive information;

comparing entries in the process table information to entries in the sensitive command attribute table information; and removing, from the output of the process table information, sensitive information associated with entries in the process table information that match one or more entries in the sensitive command attribute table.

2. The method of claim 1, wherein obtaining process table information, obtaining sensitive command attribute table information, comparing entries, and removing sensitive information are performed in response to receiving a command requesting output of the process table information.

3. The method of claim 1, wherein the sensitive command attribute table includes information identifying attributes of commands that are associated with sensitive information.

4. The method of claim 3, wherein the sensitive information is a password.

5. The method of claim 3, wherein the sensitive command attribute table includes information identifying a type of encryption used by a database in which attribute values associated with a command attribute are located.

6. The method of claim 1, further comprising:

performing a lookup of an attribute value associated with an entry in the process table information that matches an entry in the sensitive command attribute table, in a database identified by the sensitive command attribute table; and determining if the attribute value is present in the database, wherein removing sensitive information from the output of the process table information is performed in response to a determination that the attribute value is present in the database.

7. The method of claim 6, wherein the sensitive information is not removed from the output of the process table information if the attribute value is not present in the database.

8. The method of claim 1, wherein the sensitive command attribute table has a first column identifying a sensitive command and a second column identifying command attributes, associated with the sensitive command, whose attribute values are to be removed from the output of the process table information if an entry in the process table information includes the sensitive command.

* * * * *